No. 873,333. PATENTED DEC. 10, 1907.
J. M. SWEET.
SHEARS AND OTHER TOOL.
APPLICATION FILED NOV. 15, 1905.
2 SHEETS—SHEET 1.
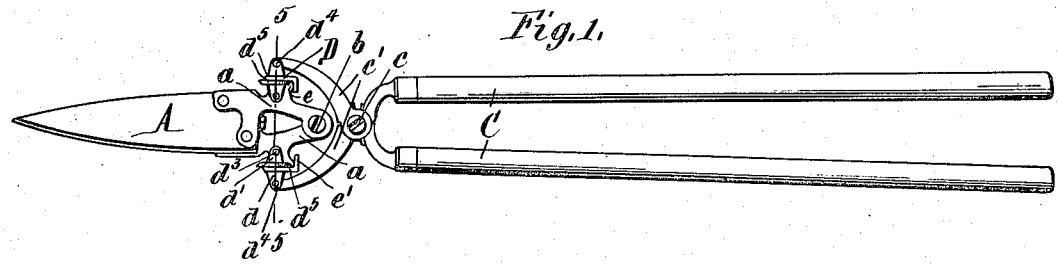
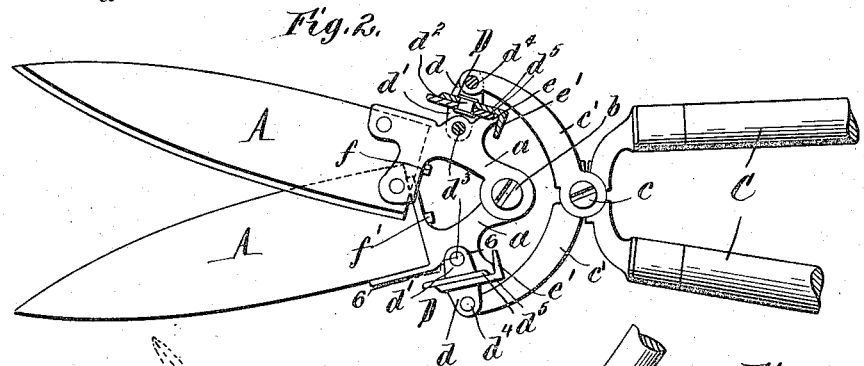
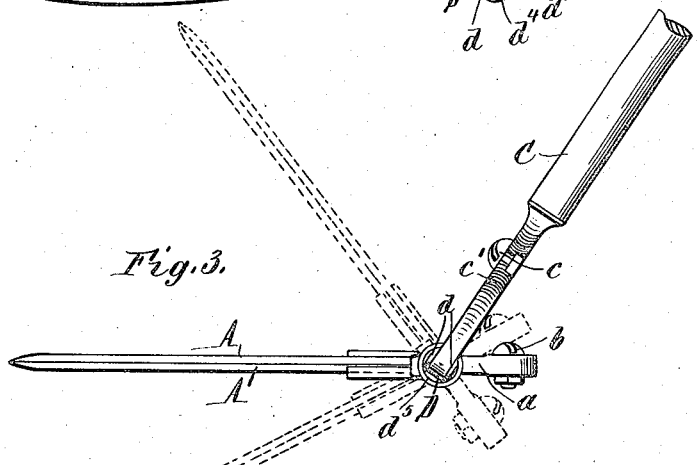
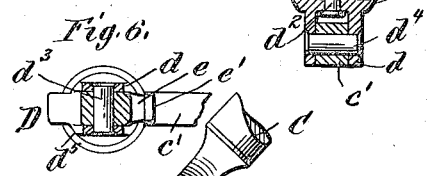
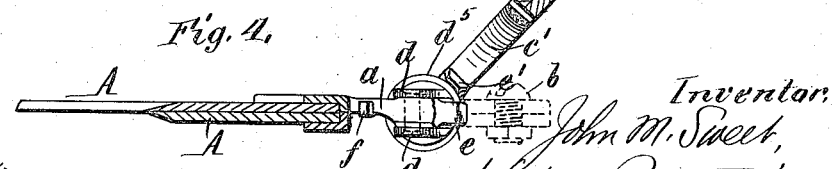
Witnesses:—
K. W. Renser.
E. A. Volk.
Inventor:
John M. Sweet,
by Wilhelm Parker & Hard,
Attorneys.

No. 873,333. PATENTED DEC. 10, 1907.
J. M. SWEET.
SHEARS AND OTHER TOOL.
APPLICATION FILED NOV. 15, 1905.
2 SHEETS—SHEET 2.
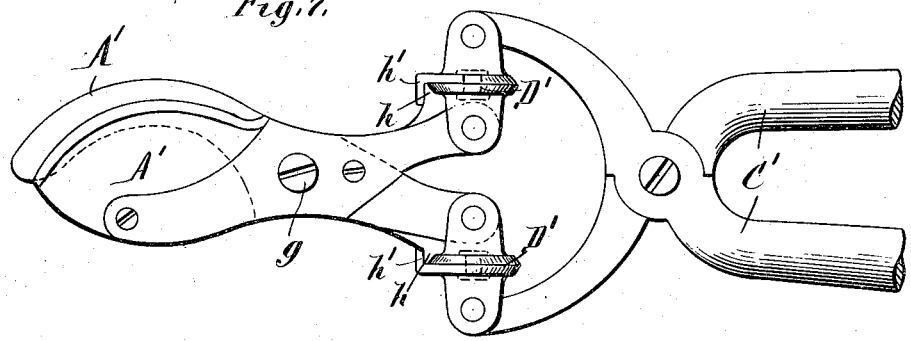
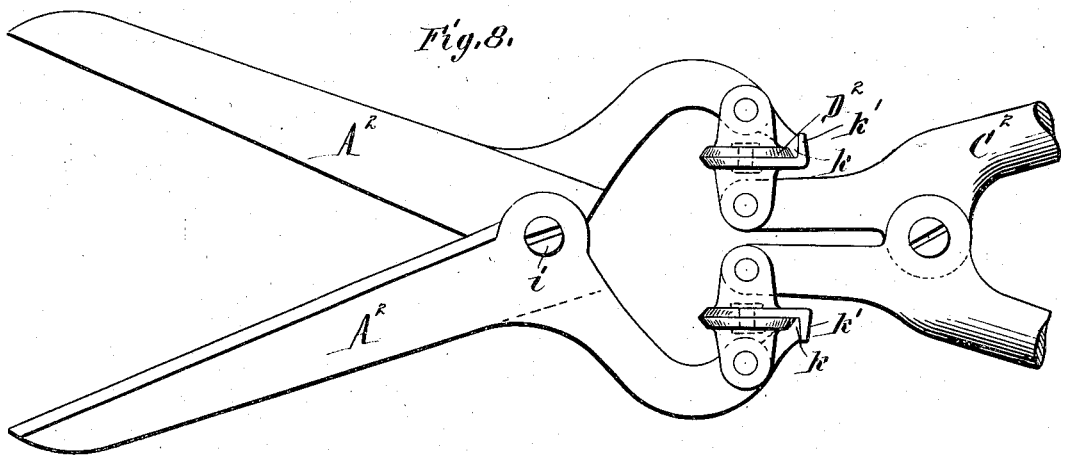

UNITED STATES PATENT OFFICE.

JOHN M. SWEET, OF BATAVIA, NEW YORK.

SHEARS AND OTHER TOOL.

No. 873,333.  Specification of Letters Patent.  Patented Dec. 10, 1907.

Application filed November 15, 1905. Serial No. 287,487.

*To all whom it may concern:*

Be it known that I, JOHN M. SWEET, a citizen of the United States, residing at Batavia, in the county of Genesee and State of New York, have invented a new and useful Improvement in Shears and other Tools, of which the following is a specification.

This invention relates more especially to improvements in shears of the kind employed for trimming lawns, shrubbery, &c., but is also applicable to other tools having pivoted members or jaws, such, for instance, as tongs, wrenches, pliers, punches and the like.

The object of the invention is to provide such tools with jointed handles enabling the pivoted members thereof to be set and operated either in the plane of the handles or at any desired angle to the plane of the handles, thereby adapting the tools for ready use in places where it would be impossible or very awkward to use tools in which the operative portions of the pivoted members bear a fixed relation to their handles.

An especial object of the invention is to produce shears having long jointed handles enabling a person while standing in a natural easy position to use the shears for trimming the edges of lawns.

In the accompanying drawings, consisting of two sheets: Figure 1 is a plan view of a pair of shears embodying the invention. Fig. 2 is a fragmentary plan partly in section, on an enlarged scale, thereof, showing the shears open. Fig. 3 is a fragmentary side elevation thereof, illustrating, by full and broken lines, different adjustments of the blades. Fig. 4 is a fragmentary sectional elevation thereof, showing the angular position of the blades as in Fig. 3. Fig. 5 is a section, on an enlarged scale in line 5—5, Fig. 1, of the universal joints connecting the shear blades to the handles. Fig. 6 is a sectional elevation in line 6—6, Fig. 2, of one of the joints connecting the shear blades to the handles. Figs. 7 and 8 are fragmentary plan views of different types of tools provided with the angularly adjustable blades.

Like letters of reference refer to like parts in the several figures.

In the tools embodying this invention the pivoted blades, jaws or members of the tools are connected to pivoted operating handle levers, by joints which enable the tool members to be set either in the plane of the handle levers or in a plane at an angle to the plane of the handles and to be operated with facility in either adjustment. The invention is applicable to tools in which the pivoted members thereof act as levers of the different classes, and to such tools whether the pivoted members thereof do or do not cross each other.

Referring particularly to Figs. 1-6, A A represent the two blades of a pair of shears, the blades being in this construction fixed to arms $a$ which are pivoted together at their rear ends in any suitable manner, for instance, by a screw or the like $b$. C represents handle levers for operating the blades. These levers instead of being rigid extensions of the blade arms, as in ordinary shears, cross each other and are pivotally connected in any suitable manner at $c$, the handle levers having front arms $c'$ which straddle the blade arms and are connected to the latter in front of the connecting pivot $b$ of the blades by joints D which are in the nature of universal joints and are preferably constructed as follows, see Figs. 2, 4 and 5: Each joint D comprises a swivel link formed of two parts $d\ d'$ pivoted together by a swivel pin or rivet $d^2$ and pivoted at opposite ends to one of the blade arms and the front arm of the adjacent handle lever, as by pins or rivets $d^3$ and $d^4$, respectively. When the blades are set in the normal position shown in Figs. 1 and 2, that is in the same plane with the handle levers, the inner and outer pivots $d^3$ and $d^4$ of the swivel links are parallel with each other and also with both of the connecting pivots $b$ and $c$ for the blades and handle levers, but when the blades are set in a plane at an angle to the plane of the handle levers, as shown in Figs. 3 and 4, the inner parts of the swivel links turn on the outer parts thereof and the inner pivots $d^3$ are turned at an angle to the outer pivots $d^4$. The inner pivots $d^3$ joining the swivel links to the blades are, however, always parallel with the connecting pivot $b$ of the blades, while the outer pivots $d^4$ joining the swivel links and handle levers are always parallel with the connecting pivot $c$ for said handle levers. The swivel joints thus constructed of the parts pivoted to each other and to the blades and handle levers enable the actuation of the blades when set in a plane at an angle to the plane of the handle levers, although the inner pivots $d^3$ swing in arcs in a plane at an angle to the plane of the arcs in which the outer pivots $d^4$ swing. Without this or some analogous universal connection between the blades and the handle levers the blades would not swing on their pivot when set at an angle to the plane of the handle levers, owing to the different arcs in which the handle levers and blades swing. Preferably the two parts of each swivel link have flat abutting disks $d^5$ which are held in close contact by the swivel pin, and offer sufficient frictional resistance to the turning of the parts of the swivel links on each other to retain the blades in the angular position in which they are set.

To produce the proper action of the blades when set in the plane of the handle levers, the swivel links should be held rigid with the blades or with the handle levers and not be allowed to swing on both the blades and the handle levers. The means employed for this purpose, in the construction shown in Figs. 1–6, consist of lugs $e$ which project from the blade arms $a$ in between the friction disks $d^5$ of the inner parts of the swivel links and lugs $e'$ projecting inwardly from the rear sides of the outer parts of the swivel links. These parts bearing against each other hold the swivel links rigid with the blades and thus retain the blades centrally between the front arms of the handle levers and prevent the shifting of the blades which would otherwise occur. When the blades are set at an angle to the handles the lugs $e$ on the blade-arms are moved out of engagement with the coöperating lugs $e'$ on the swivel links and so do not prevent the actuation of the blades. The blade arms $a$ are preferably provided with coöperating stops $f f'$ which project from each arm toward the other and strike to limit the closing movement of the blades.

In the construction shown Figs. 1–6 and above described, the shear blades do not cross, but are pivoted at their rear ends and the handle levers are connected to the blades in front of their pivot, the blades thus acting as levers of the third class, but the improvements are adapted to other kinds of shears, and two other types of shears embodying the invention are illustrated in Figs. 7 and 8.

In the construction shown in Fig. 7, the shear blades A' are carried by arms which cross and are pivoted between their ends at $g$ in any suitable manner. In this embodiment of the invention the handle levers C' are crossed and pivoted, as in the other construction, and are connected to the ends of the blade arms by swivel links D' similar to the swivel links before described. As the swivel links join the blade arms in rear of their connecting pivot, however, the interlocking lugs $h h'$ on the blade arms and swivel links, for holding the links rigid with the blade arms when the blades are set in the plane of the handle levers, as before described, are located at the front side, instead of at the rear side, of the swivel links. The shears shown in this figure are of the kind used for pruning and the blades are of the shape usual in such shears, but it will be manifest that the shape of the blades is not an essential element.

Fig. 8 shows still another construction in which the shear blades $A^2$ are pivoted between their ends at $i$ but do not cross, and in which the pivoted handle levers $C^2$ also do not cross. In this embodiment the front arms of the handle levers extend between the rear arms of the blades, to which they are connected by swivel links $D^2$. As in this construction the blades connect with the outer ends of the swivel links, the interlocking lugs $k k'$ for holding the swivel links rigid with the blade are arranged respectively on the ends of the blade arms and on the rear side of the inner parts of the swivel links.

While only shearing tools have been illustrated and specifically described herein, it should be perfectly apparent that the invention is also applicable to other tools having pivoted members regardless of the particular use to which the tools are put.

I claim as my invention:

1. The combination of pivoted tool members, pivoted handle levers therefor, and swivel connections between said tool members and said handle levers whereby the tool members can be turned to a plane at an angle to the plane of the handle levers, substantially as set forth.

2. The combination of pivoted tool members, pivoted handle levers therefor, and connections between said tool members and said handle levers having swivel joints formed therein whereby the tool members can be turned to a plane at an angle to the plane of the handle levers, substantially as set forth.

3. The combination of pivoted tool members, pivoted handle levers therefor, and links pivoted to said tool members and said handle levers and connecting the same, said links being provided with swivel joints between their points of attachment thereto whereby said tool members can be turned to a plane at an angle to the plane of said handle members, substantially as set forth.

4. The combination of pivoted tool members, pivoted handle levers therefor, links pivoted to said tool members and said handle levers and connecting the same, said links being provided with swivel joints between their points of attachment thereto whereby said tool members can be turned to a plane at an angle to the plane of said handle members, and means for holding said links rigid with one of the parts to which they are connected when the tool members and the handle levers are set in the same plane, substantially as set forth.

5. The combination of pivoted tool members, pivoted handle levers therefor, links pivoted to said tool members and said handle levers and connecting the same, said links being provided with swivel joints between their points of attachment thereto whereby said tool members can be turned to a plane at an angle to the plane of said handle members, and parts on said links and said tool members adapted to interlock to hold said links rigid therewith when said tool members and said handle levers are set in the same plane, substantially as set forth.

6. The combination of pivoted tool members, pivoted hand levers therefor, and links connecting said tool members with said hand levers and consisting of opposite end portions pivoted to said tool members and said hand levers respectively and connected together by swivel joints whereby said end portions are capable of rotary movement relative to each other, substantially as set forth.

Witness my hand, this 4th day of November, 1905.

JOHN M. SWEET.

Witnesses:
E. B. PERRY,
C. H. BERGMAN.